UNITED STATES PATENT OFFICE.

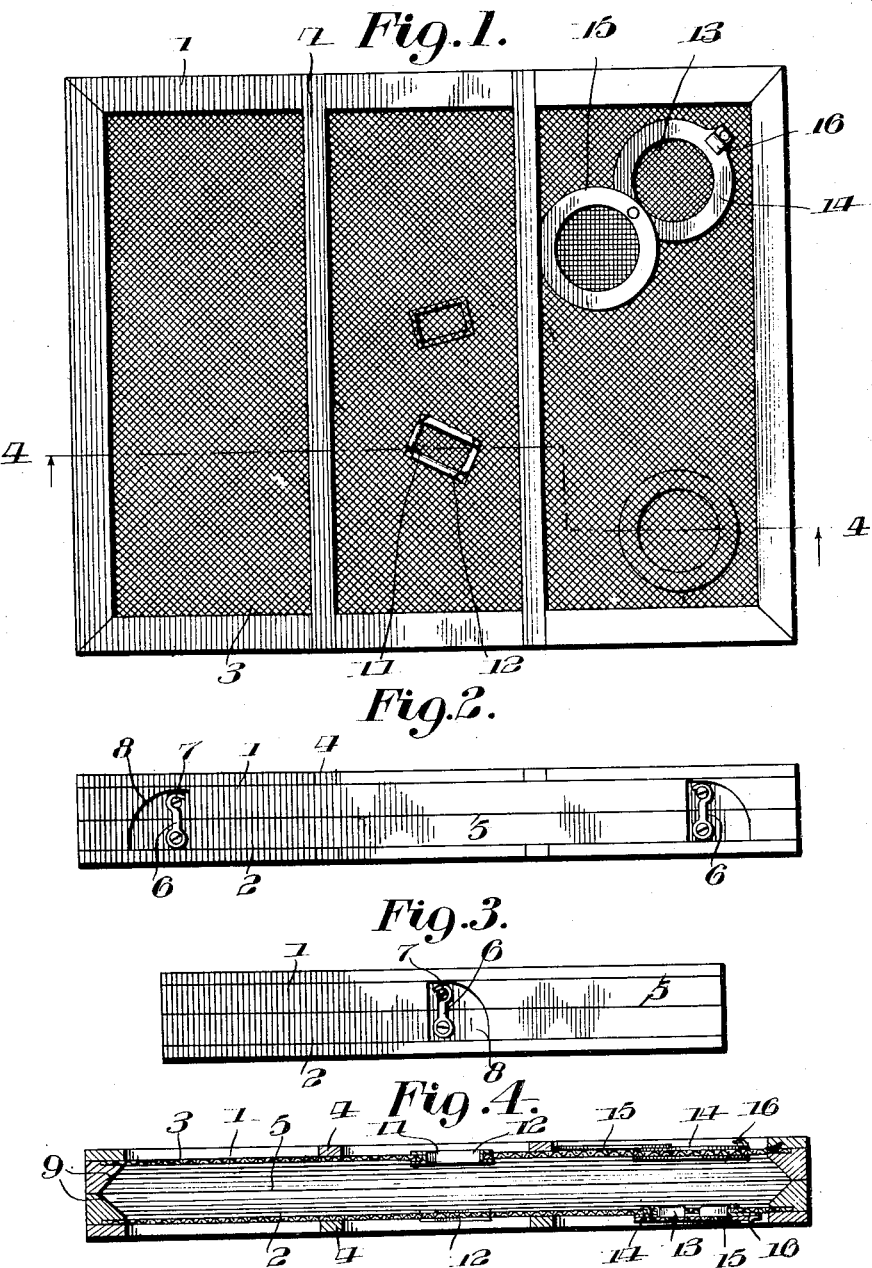

OTTO TETSCHNER, OF BURWELL, NEBRASKA.

REVERSIBLE EGG-TRAY FOR INCUBATORS.

1,071,534. Specification of Letters Patent. Patented Aug. 26, 1913.

Application filed December 3, 1912. Serial No. 734,737.

*To all whom it may concern:*

Be it known that I, OTTO TETSCHNER, a citizen of the United States, residing at Burwell, in the county of Garfield and State of Nebraska, have invented new and useful Improvements in Reversible Egg-Trays for Incubators, of which the following is a specification.

This invention relates to egg trays for incubators, the object of the invention being to provide an egg tray which may be reversed or turned upside down in a ready and convenient manner so that all the eggs therein may be simultaneously turned.

A further object of the invention is to provide an egg tray composed of counterpart sections detachably connected, whereby said sections may be conveniently coupled and uncoupled for application of the eggs and removal of the hatched chicks, and in which provision is also made for inserting and removing the eggs without the necessity of uncoupling the tray sections.

A still further object of the invention is to provide a sectional egg tray whereby the eggs may be turned without injury thereto, and which is adapted in either position it occupies to enable the contents thereof to be observed and the temperature determined at any time.

The invention consists of the features of construction, combination and arrangement of parts, hereinafter fully described and claimed, reference being had to the accompanying drawings, in which:—

Figure 1 is a plan view of an egg tray embodying my invention. Figs. 2 and 3 are side and end views thereof. Fig. 4 is a vertical longitudinal section on the line 4—4 of Fig. 1.

In carrying my invention into practice, I provide an egg tray consisting of two substantially counterpart oblong rectangular sections 1 and 2, each comprising an open frame of the form set forth across which is stretched a body of woven wire or other suitable reticulated or mesh material 3, sustained from outward deflection by cross bars 4. The rectangular frames of the two tray sections have abutting faces 5, and said sections are provided with suitable means for detachably coupling them together. The means for this purpose shown in the present instance consists of hooks 6 pivoted to the side and end pieces of one of the sections and adapted to engage headed studs 7 on the other section. The hooks and studs are arranged within recesses 8 and are therefore countersunk, so that the tray may be inserted, removed and manipulated without liability of the hooks becoming casually unfastened.

The space between the foraminous or reticulated walls 3 of the tray sections provides a chamber of proper depth for the insertion of the eggs and for the purpose of conveniently accommodating a large number of eggs in a tray of minimum size, as well as to prevent possible injury to the eggs when the tray is reversed or turned upside down, the inner faces of the side and end walls of the respective tray sections are beveled or rounded on outwardly converging lines, as shown at 9, thus allowing the points or butts of the eggs to be received therein and to move in the reversal of the tray without liability of damage thereto.

Each reticulated or foraminous wall 3 is provided with an opening 11 strengthened by a reinforcing frame or piece 12 of sheet metal, whereby a thermometer may be supported upon the wall or inserted into the egg chamber for the purpose of determining the temperature at any time. Also for the purpose of permitting of the insertion and removal of eggs without uncoupling the tray sections, each reticulated or foraminous wall 3 is provided with a doorway 13 reinforced by a plate 14 to which is pivoted a swinging closure 15 consisting of an open sheet metal frame having a filling of reticulated material, which closure is adapted to engage under a keeper 16 to maintain it in closed position.

It will be observed that the thermometer openings and doorways are arranged out of respective alinement with each other, so that all liability of a thermometer dropping through the tray or of the opposite doorways being simultaneously and casually opened will be avoided, while such arrangement also serves as a means by which the relationship of the sides to each other and their relative positions within the incubator at different periods, before and after turning the eggs, may be determined.

It will be seen from the foregoing description that the invention provides a simple and inexpensive form of tray which is adapted to permit of the ready passage of heat, to be conveniently filled and emptied, and which allows the temperature of the portion of the incubator in which it is arranged to be conveniently determined. Also that a construction of tray is provided which enables the eggs to be turned without injury, and which provides for the insertion and removal of eggs without the necessity of uncoupling the tray sections.

I claim:—

A reversible egg tray for incubators comprising a pair of substantially counterpart open rectangular frame sections, each having a filling of reticulated material, the said reticulated filling of each frame section being provided with a receiving opening and a doorway, the openings and doorways of the respective sections being arranged in non-registering relation, closures for the said doorways, and means for coupling said tray sections together.

In testimony whereof I affix my signature in presence of two witnesses.

OTTO TETSCHNER.

Witnesses:
FLOY HARTFORD,
NORA TETSCHNER.